(12) United States Patent
Galivel

(10) Patent No.: US 8,920,034 B2
(45) Date of Patent: Dec. 30, 2014

(54) GUIDE AND SEALING DEVICE FOR A TURBINE ENGINE, THE DEVICE HAVING A CARBON GASKET AND AN INTEGRATED SMOOTH BEARING

(75) Inventor: Jean Pierre Elie Galivel, Savigny le Temple (FR)

(73) Assignee: SNECMA, Paris (FR)

( * ) Notice: Subject to any disclaimer, the term of this patent is extended or adjusted under 35 U.S.C. 154(b) by 215 days.

(21) Appl. No.: 13/704,448

(22) PCT Filed: Jun. 10, 2011

(86) PCT No.: PCT/FR2011/051335
§ 371 (c)(1),
(2), (4) Date: Dec. 14, 2012

(87) PCT Pub. No.: WO2011/157937
PCT Pub. Date: Dec. 22, 2011

(65) Prior Publication Data
US 2013/0081405 A1  Apr. 4, 2013

(30) Foreign Application Priority Data
Jun. 15, 2010  (FR) ...................................... 10 54726

(51) Int. Cl.
*F02C 7/06* (2006.01)
*F02C 7/28* (2006.01)
*F01D 25/16* (2006.01)

(52) U.S. Cl.
CPC ................ *F02C 7/06* (2013.01); *F01D 25/166* (2013.01); *F02C 7/28* (2013.01); *Y02T 50/671* (2013.01); *F05D 2240/55* (2013.01)

USPC .............................................. 384/130; 60/801

(58) Field of Classification Search
CPC ............ F02C 7/06; F02C 7/28; F01D 25/166; F05D 2240/55
USPC .......... 60/801; 415/122.1; 277/352; 384/129, 384/130, 139–143, 151
See application file for complete search history.

(56) References Cited

U.S. PATENT DOCUMENTS 3,258,199 A * 6/1966 Anderson ...................... 415/175
4,709,545 A * 12/1987 Stevens et al. ............... 60/39.08

(Continued)

FOREIGN PATENT DOCUMENTS

| DE | 39 25 403 | 1/1991 |
|----|-----------|--------|
| DE | 299 08 918 | 7/1999 |

(Continued)

OTHER PUBLICATIONS

International Search Report Issued Aug. 30, 2011 in PCT/FR11/051335 Filed Jun. 10, 2011.

*Primary Examiner* — J. Gregory Pickett
(74) *Attorney, Agent, or Firm* — Oblon, Spivak, McClelland, Maier & Neustadt, L.L.P.

(57) ABSTRACT

A guide and sealing device a shaft in an orifice in a casing in a turbine engine, the device including a carbon gasket mounted around the shaft including a ring secured to the shaft and having an annular friction face rubbing against a carbon annulus mounted in a support bushing fastened to the casing, the ring presenting a cylindrical wall that is centered and guided in rotation in a cylindrical wall of the support bushing so as to form a smooth bearing for guiding the shaft.

10 Claims, 2 Drawing Sheets

(56) References Cited

U.S. PATENT DOCUMENTS 6,325,380 B1 * 12/2001 Feigl et al. .................. 277/352
2001/0028845 A1 * 10/2001 Langston et al. .......... 415/122.1

FOREIGN PATENT DOCUMENTS

| EP | 0 127 562 | 12/1984 |
| WO | 02 086299 | 10/2002 |

* cited by examiner

GUIDE AND SEALING DEVICE FOR A TURBINE ENGINE, THE DEVICE HAVING A CARBON GASKET AND AN INTEGRATED SMOOTH BEARING

The present invention relates to a guide and sealing device for a turbine engine shaft in an orifice of a casing through which the shaft passes, and also to a gearbox including such a device.

In a turbine engine, various pieces of equipment, in particular such as pumps for producing hydraulic energy, feeding fuel, providing lubrication, electricity generators for producing electrical power, etc., are driven in rotation by a gearbox connected to a shaft of the engine.

Each piece of equipment has a rotary shaft that is coupled in rotation with a transmission shaft of the gearbox. The transmission shaft carries a toothed wheel inside the gearbox that meshes with a drive gearwheel coupled by a geartrain to a compressor shaft of the engine.

The transmission shaft is guided in rotation at its ends in rolling bearings having their inner rings secured to the transmission shaft and their outer rings fastened to the casing of the gearbox. One of the ends of the transmission shaft passes through an orifice in the casing of the gearbox and is coupled in rotation with a rotary shaft of a piece of equipment.

The oil that is injected against the bearings of the gearbox in order to lubricate them becomes mixed with air, thereby creating a mist of oil inside the gearbox. In order to prevent this oil mist from leaking between the transmission shaft and the edge of the orifice in the casing, it is known to mount sealing means in the orifice between the shaft and the casing.

In the prior art, the sealing means are formed by a dynamic gasket of the carbon gasket type, the gasket having a ring secured to the shaft and presenting an annular friction face for rubbing against an annulus of porous material that is made of grains of carbon and that has a low coefficient of friction. The carbon annulus is fastened to a grain-carrier that is mounted in a support bushing fastened to the casing and that is urged axially towards the ring in order to keep the carbon annulus pressed axially against the ring. The carbon gasket thus has portions that are stationary in rotation (the support bushing, the grain-carrier, and the carbon annulus) and a portion that moves in rotation (the ring). Friction between the carbon annulus and the ring during rotation of the transmission shaft provides good sealing between the shaft and the casing.

The carbon gasket is mounted beside one of the above-mentioned rolling bearings of the gearbox. The means fastening the outer ring of the bearing to the casing are independent of the means for fastening the support bushing of the carbon gasket to the casing, thereby leading to significant axial extent and weight for the arrangement as a whole. Furthermore, the means for lubricating and/or cooling the carbon gasket are distinct from those acting on the rolling bearing, which is expensive.

A particular object of the present invention is to provide a solution to those problems of the prior art that is simple, effective, and inexpensive.

To this end, the invention provides a guide and sealing device for mounting in an orifice in a casing through which a shaft passes in a turbine engine, the device comprising a carbon gasket mounted around the shaft in the orifice of the casing and comprising a ring that is carried by the shaft and that has an annular friction face for rubbing against a carbon annulus that is mounted in a support bushing fastened to the casing and that is urged axially towards the ring, the device being characterized in that the ring has a cylindrical wall that is centered and guided in rotation in a cylindrical wall of the support bushing so as to form a smooth bearing for guiding the shaft.

In the invention, a smooth bearing is integrated with the carbon gasket of the device of the invention. This smooth bearing replaces the rolling bearing of the prior art, which can therefore be omitted. Integrating the smooth bearing with the carbon gasket makes it possible to have support and fastener means that are common to the carbon gasket and to the bearing, and also lubrication and cooling means that are common to the carbon gasket and to the bearing. Combining the carbon gasket with a smooth bearing also makes it possible to reduce the number of parts and the weight of the guide and sealing device.

The cylindrical wall of the ring may be formed as a single piece with the ring or may be a fitting that is fastened to the ring. In the same manner, the cylindrical wall of the support bushing may be made as a single piece together with the support bushing or it may be a fitting that is fastened to the bushing.

The outer cylindrical surface of the cylindrical wall of the ring and/or the inner cylindrical surface of the cylindrical wall of the support bushing may be covered in a thin layer or a hoop, the thin layer or the hoop being made of a material that is hard and has a low coefficient of friction.

The inner cylindrical surface of the cylindrical wall of the ring may define an annular groove opening out axially away from the carbon annulus and into which cooling oil is to be injected, for the purpose of dissipating the heat produced by the smooth bearing and the carbon gasket in operation.

Advantageously, the inner cylindrical surface of the cylindrical wall of the support bushing defines a housing having mounted therein the ring and the carbon annulus that is secured to a grain-carrier guided in the support bushing. The device of the invention is thus relatively compact, thereby making the engine as a whole simpler to assemble and disassemble.

The present invention also provides a turbine engine gearbox for providing rotary drive to at least one piece of rotary equipment, the gearbox being characterized in that it includes a casing having an orifice through which a transmission shaft passes and a guide and sealing device of the above-specified type that is mounted around the shaft in the orifice in the casing.

Advantageously, the shaft may present a cylindrical wall that is surrounded with clearance by a cylindrical wall of the casing so as to form an emergency smooth bearing that does not operate in normal operation. This emergency smooth bearing is intended to center and guide the transmission shaft temporarily in the event of the smooth bearing of the sealing device breaking. The radial clearance between the cylindrical walls of the shaft and the casing is thus determined in such a manner that these walls do not co-operate with each other in normal operation. The emergency bearing also serves to hold the transmission shaft radially in position during operations of assembling and disassembling the device of the invention.

The invention also provides a turbine engine, such as a turboprop or a turbojet, including a guide and sealing device as described above.

The invention can be better understood and other details, advantages, and characteristics of the invention appear on reading the following description made by way of non-limiting example and with reference to the accompanying drawings, in which.

Figure 1:
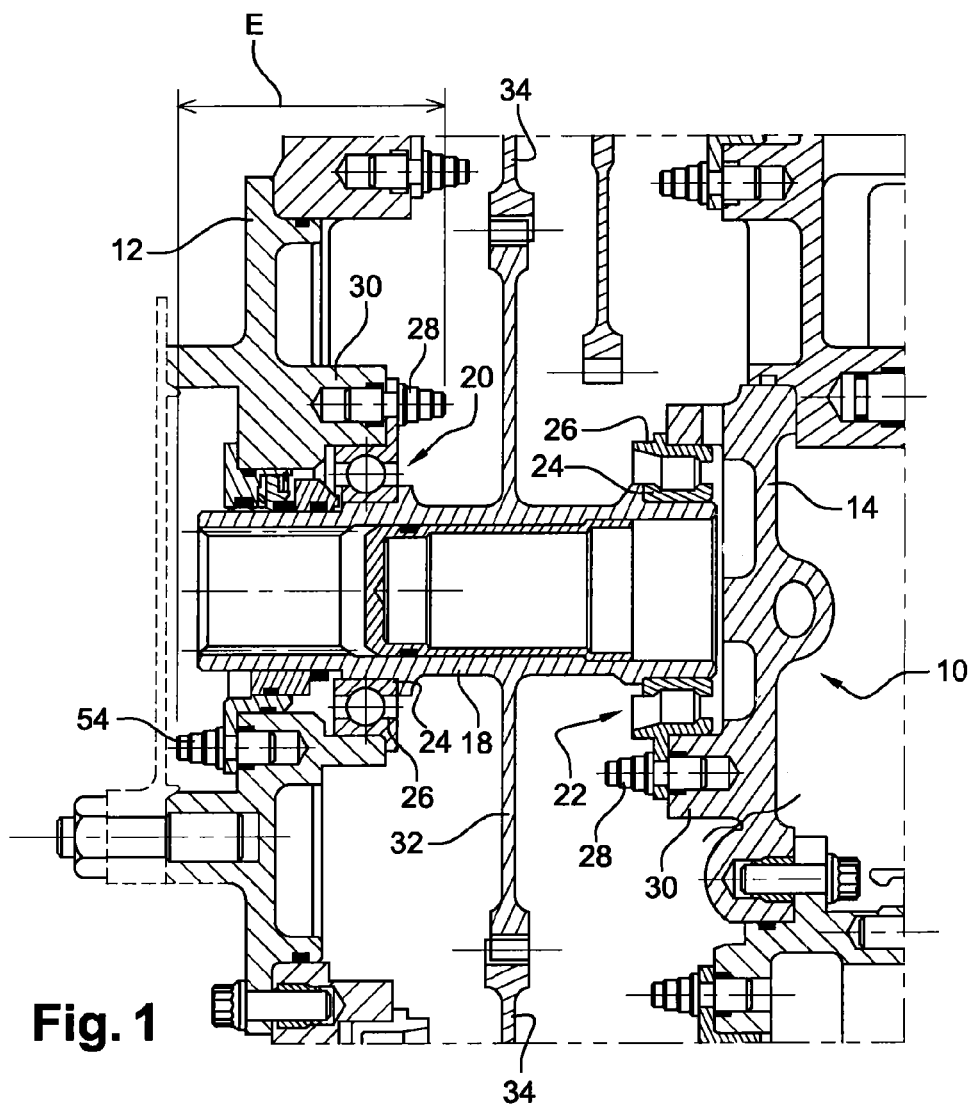
FIG. 1 is a diagrammatic axial section view of a portion of a prior art turbine engine gearbox.
Figure 2:
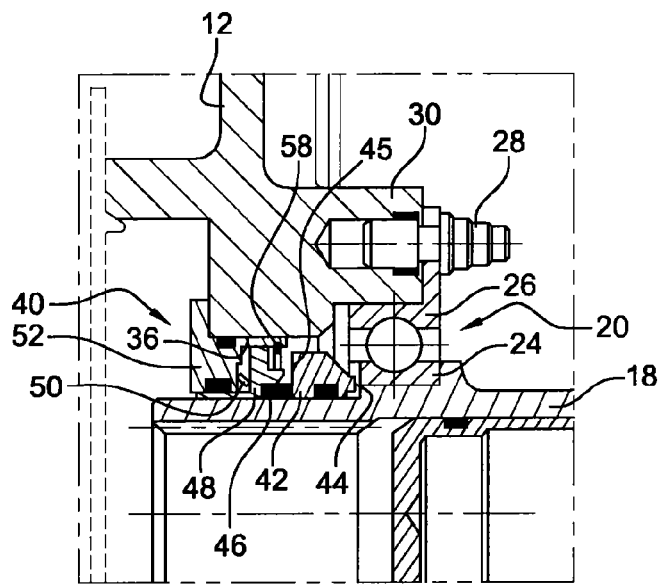
FIG. 2 is a view on a larger scale of a portion of FIG. 1.

Reference is made initially to FIGS. 1 and 2, which show a portion of a prior art turbine engine gearbox 10, the gearbox 10 having an inlet element (not shown) connected to a drive shaft of the compressor of the engine and gearwheels driving a plurality of pieces of equipment such as, for example: an oil pump, a hydraulic pump, a fuel pump, a starter, an electricity generator, etc.

The gearbox 10 has a front casing 12 and a rear casing 14 between which there extend a plurality of transmission shafts 18 that are for coupling to pieces of rotary equipment.

The transmission shaft 18 shown in the drawing is guided in rotation at its ends in two rolling bearings, one of which, 20, is a ball bearing, and the other of which, 22, is a roller bearing. Each of the bearings 20, 22 has an inner ring 24 carried by the transmission shaft 18, and an outer ring 26 fastened by means of screws 28 to bosses 30 of the front and rear casings 12 and 14, respectively. Each bearing 20, 22 is fed with oil by a specific lubrication circuit.

The transmission shaft 18 carries a toothed wheel 32 arranged between the two rolling bearings 20 and 22, and meshing with drive gearwheels 34.

As can be seen better in FIG. 2, the front end portion of the transmission shaft 18 passes through an orifice 36 formed in the boss 30 of the casing and it is centered and guided in this orifice by means of the above-mentioned ball bearing 20.

The ball bearing 20 is engaged in the rear end portion of the orifice 36 in the casing and a sealing gasket such as a carbon gasket 40 is mounted around the transmission shaft 18 in the front end portion of the orifice 36. The carbon gasket 40 prevents the air/oil mixture that is contained in the gearbox from leaking out, the oil being injected onto the bearings 20 and 22 in order to lubricate them, and also on the carbon gasket 40 in order to cool it.

The carbon gasket 40 has a ring 42 mounted on the transmission shaft 18 and including at its rear end interconnection means 44 co-operating with complementary means of the inner ring 24 of the bearing 20 so as to constrain it in rotation with the shaft 18.

At its front end, the ring 42 has a radial friction face rubbing against a carbon annulus 46 secured to a grain-carrier 48 that is urged axially towards the ring 42 by spring means 50 mounted at the front of the grain-carrier, between the grain-carrier and a support bushing 52 fastened to the casing 12.

The carbon annulus 46 is made up of grains of carbon mixed with a binder and impregnated with a lubricant. The ring has a low dynamic coefficient of friction.

The support bushing 52 carries locking means 58 co-operating the grain-carrier 48 to prevent it from turning and to limit its rearwards axial stroke. It also has an outer annular flange for fastening on the front casing 12 by means of screws 54 (FIG. 1).

As explained above, the fastener means (screws 28 and 54) of the bearing 20 and of the carbon gasket 40 are distinct, thereby giving rise to a considerable axial extent E for the assembly comprising the carbon gasket and the bearing (FIG. 1). That technology also presents other drawbacks as described above.

The invention provides a solution to those drawbacks by integrating a smooth bearing with the carbon gasket, thus making it possible to eliminate the prior art rolling bearing together with its fastener means, thereby giving rise to an axial extent E' for the guide and sealing device formed by the carbon gasket and the bearing that is less than the extent E in the prior art.

Figure 3:
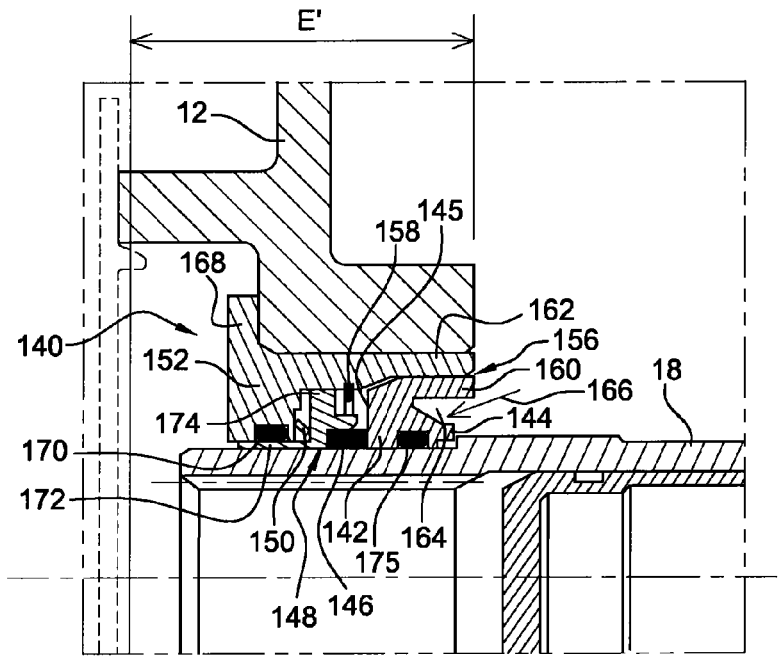
FIG. 3 is a view corresponding to FIG. 2 and showing the invention.

As shown in FIG. 3, the carbon gasket 140 differs from the above-described gasket in that its ring 142 has a cylindrical wall 160 that is engaged and guided in a cylindrical wall 162 of the support bushing 152 so as to form said smooth bearing 156.

In the example shown, the cylindrical wall 160 of the ring 142 extends rearwards from the outer periphery of the ring. The inner cylindrical surface of the wall 160 defines an annular groove 164 into which oil is to be injected (arrow 166) in order to dissipate the heat generated by friction in the smooth bearing 156 and the carbon gasket 140.

The cylindrical wall 162 of the support bushing 152 extends downshaft and surrounds the spring means 150, the grain-carrier 148, the carbon annulus 146, and the ring 142.

The contacting cylindrical surfaces of the cylindrical walls 160 and 162 may be coated in a thin layer of a hard material such as tungsten or chromium carbide.

The outer cylindrical surface of the wall 162 co-operates with the inner cylindrical surface of the orifice 136 of the casing 12 to center the carbon gasket 140 in the orifice during assembly.

The support bushing 152 carries an annular flange at the front that is fastened by screws to the front face of the casing 12.

The support bushing 152 also has an annular groove at its inner periphery that opens out radially towards the inside and that receives a sealing O-ring 170 co-operating with a front cylindrical wall 172 of the grain-carrier 148, which wall is connected at its rear end to a radial wall 174.

The support bushing 152 and the ring 142 are made of steel, for example.

The spring means 150 are mounted between a rearwardly-facing radial face of the support bushing 152 and the front-facing radial face of the radial wall 174 of the grain-carrier 148. By way of example, these means 150 are formed by a corrugated washer.

The axial travel stroke of the grain-carrier 148 (which is equal to approximately a few tenths of a millimeter, for example) is limited by locking means 158 constituting an abutment and mounted behind the grain-carrier and carried by the support bushing 152. These locking means 158 prevent the grain-carrier 148 from turning in the support bushing 152.

The carbon annulus 146 is fastened on a rear radial face of the grain-carrier 148 and is held bearing axially against the front radial face 145 of the ring 142 during rotation of the transmission shaft 18 so as to provide axial sealing around the shaft, with this being ensured regardless of the degree of wear of the carbon annulus.

At its inner periphery, the ring 142 has an annular groove opening out radially inwards and receiving a sealing O-ring 175 that co-operates with the outer cylindrical surface of the transmission shaft 18. The ring 142 also includes interconnection means 144, which in this example co-operate with complementary means of the transmission shaft 18 in order to be constrained to rotate with the shaft.

In operation, the transmission shaft 18 is guided in rotation by the smooth bearing 156 and the carbon annulus 146 rubs against the ring 142 in order to limit leaks of the air/oil mixture from the inside to the outside of the gearbox, through the orifice 36. Cooling oil is injected into the groove 164 (arrow 166) in order to remove the heat produced by friction in the smooth bearing 156 and the carbon gasket 140.

Figure 4:
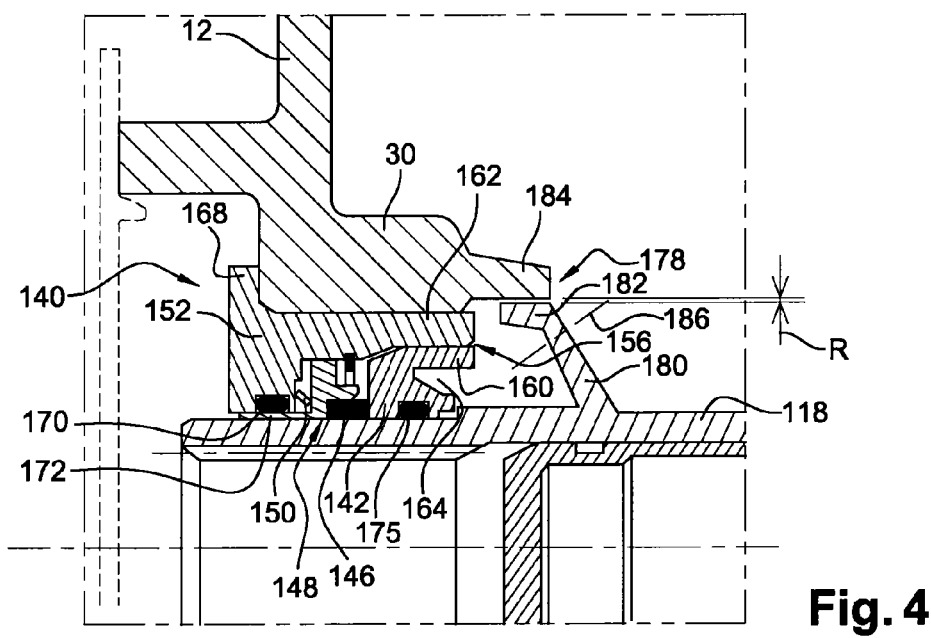
FIG. 4 is another view corresponding to FIG. 2 and showing a variant embodiment of the invention.

In the variant embodiment of FIG. 4, the carbon gasket 140 and the smooth bearing 156 are identical to those described above, and only the transmission shaft 118 and the casing 12 are modified in order to create an emergency smooth bearing 178 that does not function as such in normal operation.

To the rear of the carbon gasket 140 and the smooth bearing 156, the transmission shaft 118 has a frustoconical wall 180 connected at its larger-diameter front end to a cylindrical wall 182 that is surrounded with radial clearance R by a cylindrical wall 184 of the casing 12, which wall extends in this example downshaft from the boss 30 of the casing.

The clearance R (which is of the order of approximately a few tenths of a millimeter) is calculated so that the cylindrical walls 182 and 184 do not co-operate with each other in normal operation of the engine. In the event of the smooth bearing 156 integrated with the carbon gasket 140 breaking, then the smooth bearing 178 can provide emergency temporary guidance for the transmission shaft 118. Furthermore, when the carbon gasket 140 is disassembled and then removed from the gearbox, the downshaft end portion of the transmission shaft 118 remains held radially by the emergency bearing.

The frustoconical wall 180 of the transmission shaft 118 in this example has orifices 186 for passing the oil that is injected into the groove 164 formed by the cylindrical wall 160 of the ring 142 of the carbon gasket.

The invention claimed is:

1. A guide and sealing device for mounting in an orifice in a casing through which a shaft passes in a turbine engine, the device comprising:
   a carbon gasket mounted around the shaft in the orifice of the casing and comprising a ring that is carried by the shaft and that has an annular friction face for rubbing against a carbon annulus that is mounted in a support bushing fastened to the casing and that is urged axially towards the ring;
   wherein the ring includes a cylindrical wall that is centered and guided in rotation in a cylindrical wall of the support bushing so as to form a smooth bearing for guiding the shaft.

2. A device according to claim 1, wherein the cylindrical wall of the ring is formed as a single piece with the ring or is a fitting that is fastened to the ring.

3. A device according to claim 1, wherein the cylindrical wall of the ring presents an outer cylindrical surface that is coated in a thin layer or that is surrounded by a hoop, the thin layer or the hoop being made of a material that is hard and has a low coefficient of friction.

4. A device according to claim 1, wherein the inner cylindrical surface of the cylindrical wall of the ring defines an annular groove opening out axially away from the carbon annulus and into which cooling oil is to be injected.

5. A device according to claim 1, wherein the cylindrical wall of the support bushing is made as a single piece with the support bushing or is a fitting that is fastened to the bushing.

6. A device according to claim 1, wherein the cylindrical wall of the support bushing presents an inner cylindrical surface that is coated in a thin layer or that has a hoop mounted thereon, the thin layer or the hoop being made of a material that is hard and has a low coefficient of friction.

7. A device according to claim 1, wherein the inner cylindrical surface of the cylindrical wall of the support bushing defines a housing having mounted therein the ring and the carbon annulus that is secured to a grain-carrier guided in the support bushing.

8. A turbine engine gearbox for providing rotary drive to at least one piece of rotary equipment, the gearbox being comprising:
   a casing having an orifice through which a transmission shaft passes and a guide and sealing device according to claim 1 that is mounted around the shaft in the orifice in the casing.

9. A gearbox according to claim 8, wherein the transmission shaft carries a cylindrical wall that is surrounded with clearance by a cylindrical wall of the casing so as to form an emergency smooth bearing that does not operate in normal operation.

10. A turbine engine, a turboprop, or a turbojet, comprising at least one guide and sealing device according to claim 1.

* * * * *